US012774878B2

(12) United States Patent
Parisot et al.

(10) Patent No.: US 12,774,878 B2
(45) Date of Patent: Oct. 27, 2026

(54) RING SIZING DEVICE

(71) Applicant: Oura Health Oy, Oulu (FI)

(72) Inventors: Benjamin Parisot, San Francisco, CA (US); Marielle Mankey, Chicago, IL (US); Alejandro Sanguinetti, Espoo (FI); Jonathan Remple, San Francisco, CA (US); Mikko Latomäki, Helsinki (FI); Tuukka Järvenpää, Littoinen (FI); Liliia Troianenko, Helsinki (FI); Imogen Griffiths, San Francisco, CA (US); Nathan Morris, San Francisco, CA (US); Keaton Nostdahl, San Francisco, CA (US)

(73) Assignee: Oura Health Oy, Oulu (FI)

( * ) Notice: Subject to any disclaimer, the term of this patent is extended or adjusted under 35 U.S.C. 154(b) by 350 days.

(21) Appl. No.: 18/639,883

(22) Filed: Apr. 18, 2024

(65) Prior Publication Data

US 2024/0353212 A1 Oct. 24, 2024

Related U.S. Application Data

(60) Provisional application No. 63/497,677, filed on Apr. 21, 2023.

(51) Int. Cl.
*G01B 3/34* (2006.01)

(52) U.S. Cl.
CPC .................................... *G01B 3/34* (2013.01)

(58) Field of Classification Search
CPC ...................................................... G01B 3/34
USPC .. 33/512, 514.1, 555.1, 555.2, 555.3, 555.4, 33/562
See application file for complete search history.

(56) References Cited

U.S. PATENT DOCUMENTS

| | | | | | |
|---|---|---|---|---|---|
| 146,974 | A | * | 2/1874 | Stone | A44C 9/02 D10/64 |
| 1,212,279 | A | * | 1/1917 | Allen | G01C 11/00 33/1 A |
| 2,413,566 | A | * | 12/1946 | Hohwart | G01B 3/34 33/555.2 |
| 2,443,904 | A | * | 6/1948 | Fishman | G01B 3/36 33/199 R |

(Continued)

FOREIGN PATENT DOCUMENTS

| | | | | |
|---|---|---|---|---|
| JP | 3190333 U | * | 5/2014 | |
| KR | 102069278 B1 | * | 3/2020 | G06F 17/00 |

*Primary Examiner* — George B Bennett
(74) *Attorney, Agent, or Firm* — ArentFox Schiff LLP

(57) ABSTRACT

Methods and devices for ring sizing are described, including a ring sizing device that may be affixed to a platform, that allows users to evaluate ring sizes. The ring sizing device may include a stationary panel and a movable panel, where the stationary panel may include a bottom portion configured to be affixed to a mounting platform and a top portion having a top edge with one or more semicircular-shaped notches. The movable panel may be coupled with the stationary panel and configured to move relative to the stationary panel. The bottom edge of the movable panel also may include one or more semicircular-shaped notches and the combination of the panels may form one or more ring sizing holes that have an associated first height when the movable panel is in the first position and a larger second height when the movable panel is in the second position.

20 Claims, 12 Drawing Sheets

(56) References Cited

U.S. PATENT DOCUMENTS

| | | | | | |
|---|---|---|---|---|---|
| 2,508,826 | A * | 5/1950 | Hohwart | G01B 3/34 403/296 |
| 3,548,506 | A * | 12/1970 | Harrington | G01B 3/34 D10/64 |
| 3,639,995 | A * | 2/1972 | Gardner | G01B 3/34 33/771 |
| 3,858,325 | A * | 1/1975 | Goerler | G01B 3/36 D10/64 |
| 4,964,222 | A * | 10/1990 | Keener | G01B 3/30 33/544.4 |
| 5,170,570 | A * | 12/1992 | Mays, Jr. | A41D 19/046 D10/64 |
| 5,353,513 | A * | 10/1994 | Round | G01B 3/46 33/555.2 |
| 5,617,644 | A * | 4/1997 | Bonelli | A24F 47/00 33/555.2 |
| 6,279,244 | B1 * | 8/2001 | Kelley | G01B 3/34 63/15 |
| 7,181,858 | B2 * | 2/2007 | Haug | G01B 5/025 D10/64 |
| 9,573,209 | B2 * | 2/2017 | Scheibel | G01B 5/08 |
| 10,639,730 | B2 * | 5/2020 | Whaley | B23D 49/105 |

* cited by examiner

RING SIZING DEVICE

CROSS-REFERENCE

The present application for patent claims the benefit of U.S. Provisional Patent Application No. 63/497,677 by Parisot et al., entitled "RING SIZING DEVICE," filed Apr. 21, 2023, assigned to the assignee hereof and expressly incorporated by reference herein.

FIELD OF TECHNOLOGY

The following relates to ring sizing devices, including stationary and movable portions that allow dimensions of a ring sizing hole to be adjusted.

BACKGROUND

Some wearable devices may be configured to collect physiological data from users, including heart rate, motion data, temperature data, photoplethysmogram (PPG) data, and the like. In some cases, some wearable devices may perform various actions, such as providing certain health insights to users, based on acquired physiological data in order to assist the user with improving their overall health.

To provide proper function and user comfort, such wearable devices should be sized appropriately for a user. For example, a ring wearable device should be sized appropriately to a user's finger. Further, it may be desirable for such ring sizing to be efficient and easily performed with little or no individualizes assistance. Thus, efficient and intuitive techniques for ring sizing may be desirable to help enhance user experience in ring sizing and provide for an effective and comfortable fit for the wearable device.

DETAILED DESCRIPTION

Figure 1:
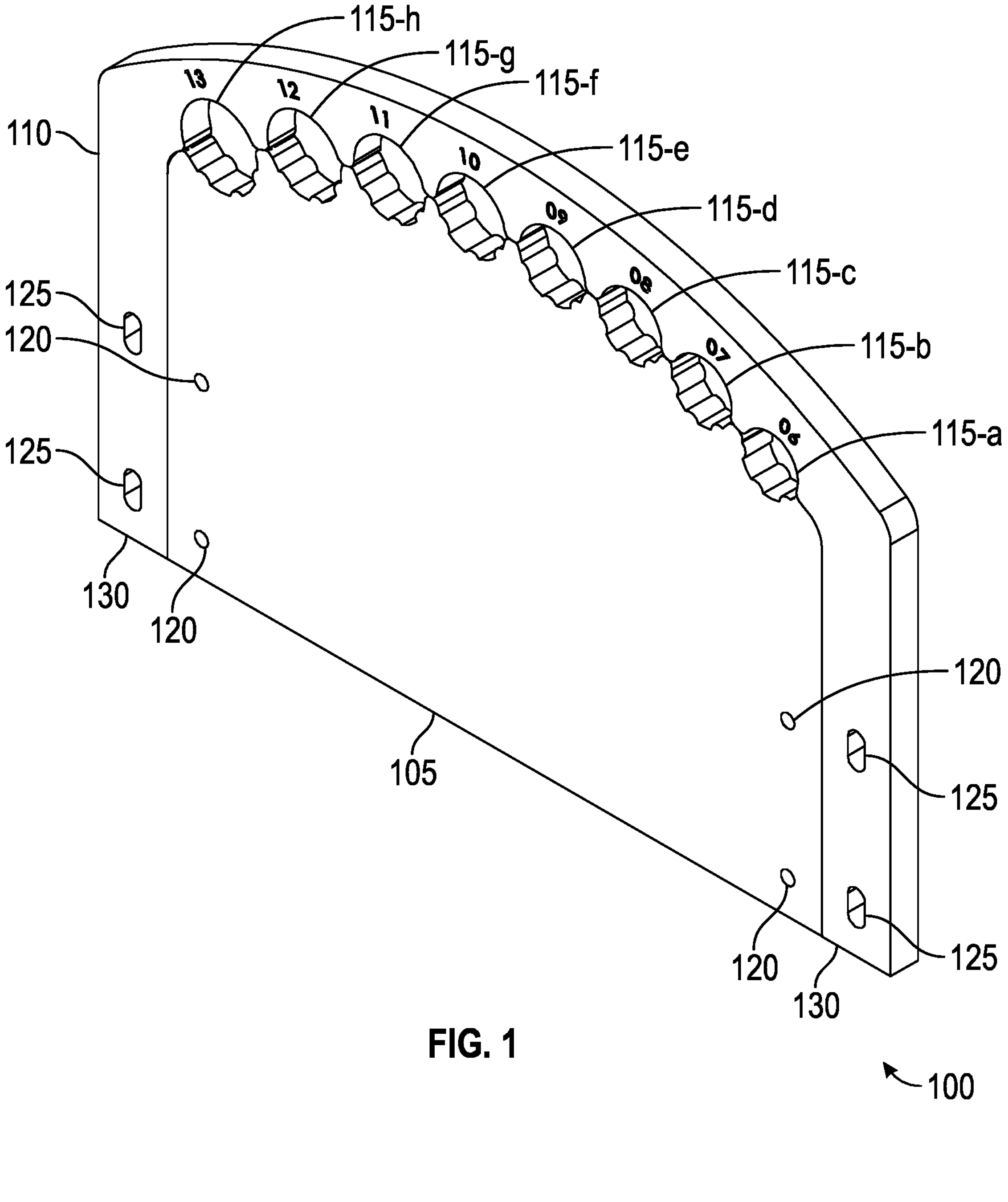
FIGS. 1 and 2 illustrate an example of a ring sizing apparatus in accordance with aspects of the present disclosure.

An individual may use a wearable device (e.g., a wearable ring device) to collect, monitor, and track physiological data of the individual based on sensor measurements of the wearable ring device. Examples of physiological data may include temperature data, heart rate data, photoplethysmography (PPG) data, and the like. The physiological data collected, monitored, and tracked via the wearable ring device may be used to gain health insights about the user.

In some cases, one or more sensors of the wearable ring device may be located between an inner housing of the wearable ring device and an outer housing of the wearable ring device. In such cases, in order to provide appropriate proximity of the one or more sensors and a user's finger, the ring should be sized appropriately to maintain proximity of the sensor(s) while also providing a comfortable fit for the user. Some traditional techniques for ring sizing may allow a user to try on multiple different rings that each have a different ring size, and select the size that provides appropriate fit for one or more fingers on which the user intends to wear the device. However, in some retail environments, having a user try on multiple different rings may not be reliable for multiple users that may perform ring sizing with little or no assistance from sales associates of a retailer. For example, a retailer may have a display that shows multiple different colors, styles, or both, for a ring wearable device, and having a traditional ring sizing kit may result in one or more of the sizing rings being misplaced or inadvertently removed from the display area. In such cases, subsequent customers may be unable to accurately and reliably determine their ring size, due to one or more rings in a ring sizing kit being missing.

In accordance with various aspects discussed herein, a ring sizing device may be provided that is affixed to a platform and allows users to evaluate ring sizes without the use of separate sizing rings that could be misplaced or lost. In some aspects, a ring sizing device may include a stationary panel and a movable panel. The stationary panel may include a bottom portion configured to be affixed to a mounting platform and a top portion having a top edge with one or more semicircular-shaped notches (e.g., semicircular, approximately semicircular, or semi-elliptical cutouts in a top edge of a vertical panel), where each of the one or more semicircular-shaped notches have a corresponding radius that is associated with one or more different ring sizes. In some aspects, the movable panel is coupled with the stationary panel and configured to move between a first position in which one or more portions of a bottom edge of the movable panel are in contact with the top edge of the stationary panel, and a second position in which a gap is present between the one or more portions of the bottom edge of the movable panel and the top edge of the stationary panel. The bottom edge of the movable panel also may include one or more semicircular-shaped notches, each having a corresponding radius that is associated with one or more different ring sizes. The one or more semicircular notches on the movable panel may be aligned with a corresponding semicircular notch of the stationary panel, such that one or more ring sizing holes are provided by the combination of the stationary and movable panels. Further, each of the one or more ring sizing holes may have an associated first height when the movable panel is in the first position and a second height that is larger than the first height when the movable panel is in the second position.

In some aspects, each of the stationary panel and the movable panel have multiple semicircular notches to provide multiple ring sizing holes associated with different ring sizes. In other aspects, separate devices with associated movable panels and stationary panels may be provided to form ring sizing holes that are each associated with different ring sizes. In some cases, each of the stationary panel and the movable panel are mounted to a platform, in which the movable panel has a top portion configured to adjoin the top portion of the stationary panel, and two legs that extend on each side of the stationary panel to the platform. Each leg may be coupled with the platform via a slot-shaped opening that allows for movement of the movable panel upward and downward relative to the platform and the stationary panel. In other aspects, the movable panel may be coupled with the stationary panel via a rod or plate that allows movement of the movable panel between the first position and second position relative to the stationary panel.

Additionally, or alternatively, a method for ring sizing is provided. The method may include a user inserting a first finger into a first sizing hole of a ring sizing apparatus that includes a movable portion and a stationary portion, where the ring sizing apparatus has multiple sizing holes associated with multiple different ring sizes. The user may lift the movable portion of the ring sizing apparatus from a first position to a second position to enlarge the first sizing hole, which may provide for easier removal of the first finger in the event that the first sizing hole is too tight to easily remove the first finger. The user may thus remove the first finger from the first sizing hole of the ring sizing apparatus and insert the first finger into one or more other ring sizing holes of the ring sizing apparatus. One of the ring sizes of the multiple different ring sizes may be selected based on a corresponding ring size that provided a suitable fit and comfort for the user.

Accordingly, aspects of the present disclosure may support ring sizing that reduces likelihood of missing or misplaced sizing rings that may otherwise occur in cases where multiple different sizing rings are provided for ring sizing. Ring sizing devices provided in accordance with various aspects may thus be used in locations where users may access the devices while sales staff are not present or are assisting others, and thus provide an efficient and accurate ring sizing determination.

Although the examples described herein are related to sizing for a wearable ring device, it should be understood that the described techniques and devices may be applied to sizing related to other devices or items, such as other wearables (e.g., watches, bands), or other jewelry or devices.

Aspects of the disclosure are initially described in the context of ring sizing devices supporting sizing determination from users via multiple sizing holes associated with one or more ring sizing devices provided in accordance with the described aspects. Aspects of the disclosure are further illustrated by and described with reference to flowcharts that relate to ring sizing techniques using ring sizing devices provided in accordance with the described aspects.

Figure 2:
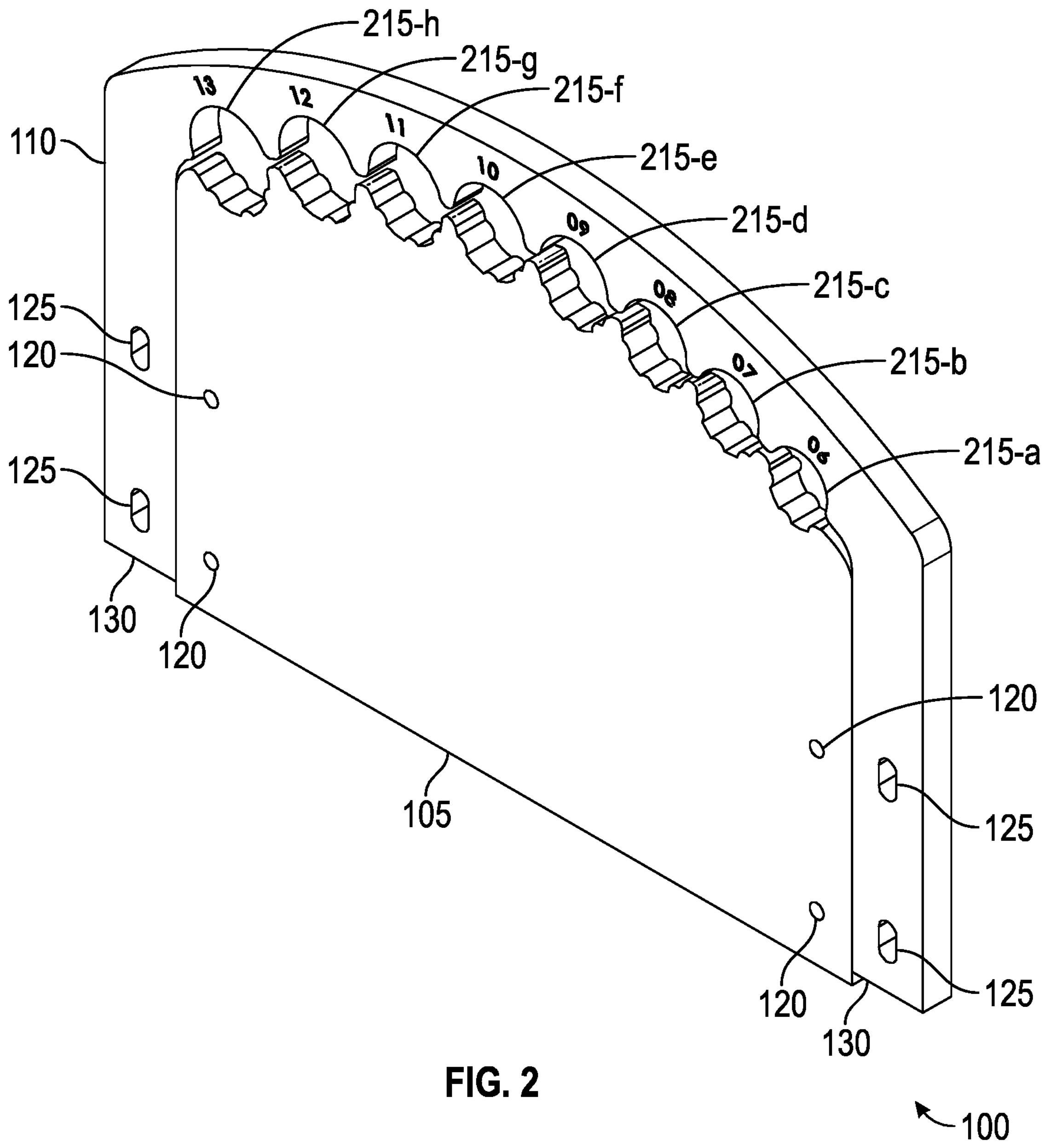

FIGS. 1 and 2 illustrate an example of a ring sizing device 100 that supports determination of a user's ring size in accordance with aspects of the present disclosure. The ring sizing device 100 includes a stationary panel 105 and a movable panel 110. In this example, multiple sizing holes 115 may be provided by a combination of the stationary panel 105 and movable panel 110, that are each associated with a different ring size. For example, a first sizing hole 115-*a* may be associated with a first ring size (e.g., ring size 6), a second sizing hole 115-*b* may be associated with a second ring size (e.g., ring size 7), and so on through sizing hole 115-*h* in this example. Each of the sizing holes 115 may be formed from corresponding semicircular, or semi-elliptical, notches in the associated panels that combine to form a hole of the appropriate size when the movable panel 110 is in a first position relative to the stationary panel 105, such as illustrated in FIG. 1. That is, a top edge of the stationary panel 105 may include multiple semicircular notches, and a bottom edge of the movable panel 110 may include corresponding semicircular notches that are aligned with the notches of the stationary panel 105 to form the sizing holes 115. When the movable panel 110 is in a first position in which non-notched portions of the bottom edge are in contact with the top edge of the stationary panel 105, each of the sizing holes 115 has an associated height that corresponds to the associated ring size.

In accordance with various aspects, the movable panel 110 may be moved to a second position relative to the stationary panel 105, such illustrated in FIG. 2 and illustrated by arrows 205. In such a configuration, each of the sizing holes 215 formed from the combination of the movable panel 110 and the stationary panel 105 may have a larger height than when the movable panel 110 is in the first position. Such movement between the movable panel 110 and the stationary panel 105 may allow a user to more easily remove a finger in cases where the associated ring size is too tight to otherwise allow for easy and comfortable removal of the finger. In this example, the movable panel 110 may have an upper portion that includes the semicircular notches, and a pair of legs 130 that extend downward along the sides of the stationary panel 105. In some examples, in order to provide a more secure coupling between the movable panel 110 and the stationary panel 105, a groove may be provided in the movable panel 110 on an inside of each leg 130 that engages with a tongue that is provided on the sides of the stationary panel 105, such that the movable panel 110 maintains alignment with the stationary panel 105 when in both the first position and the second position.

In the example of FIGS. 1 and 2, the stationary panel 105 may have mounting holes 120 that may engage with a mounting platform to secure the stationary panel to the mounting platform in a fixed manner. In such aspects, the movable panel 110 may have mounting slots 125 that may engage with the mounting platform to movably secure the movable panel to the mounting platform. Examples of such securement to a mounting platform as discussed in further detail with reference to the examples of FIGS. 3 and 4. In some aspects, each of the stationary panel 105 and the movable panel 110 may be formed from a rigid material (e.g., a rigid sheet material having a thickness of 5 millimeters, although thicker or thinner material may be used) that may be secured to the mounting platform to provide reliable use by a relatively large number of users. In some examples, the stationary panel 105 and the movable panel 110 may be made from one or more of plastic material, wood, composite material, metal, stone, engineered material (e.g., fiberboard or engineered quartz), carbon fiber, glass, polycarbonate, PVC plates, foamed PVC plates, polystyrene, cardboard, or any combinations thereof. In some examples, each of the sizing holes 115 may have one or more domes or raised surfaces that correspond to placement of one or more sensors of a wearable device.

Much of the present disclosure may be described in the context of a ring wearable device. Accordingly, the terms "ring," "wearable device," and like terms, may be used interchangeably, unless noted otherwise herein. However, the use of the term "ring" is not to be regarded as limiting, as it is contemplated herein that aspects of the present disclosure may be used for sizing for other wearable devices (e.g., watch wearable devices, bracelet wearable devices, anklet wearable devices, and the like, in which the corresponding body part of the user would be inserted and removed from different sizing holes in accordance with techniques as discussed herein).

It should be appreciated by a person skilled in the art that one or more aspects of the disclosure may be implemented in a device 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 3:
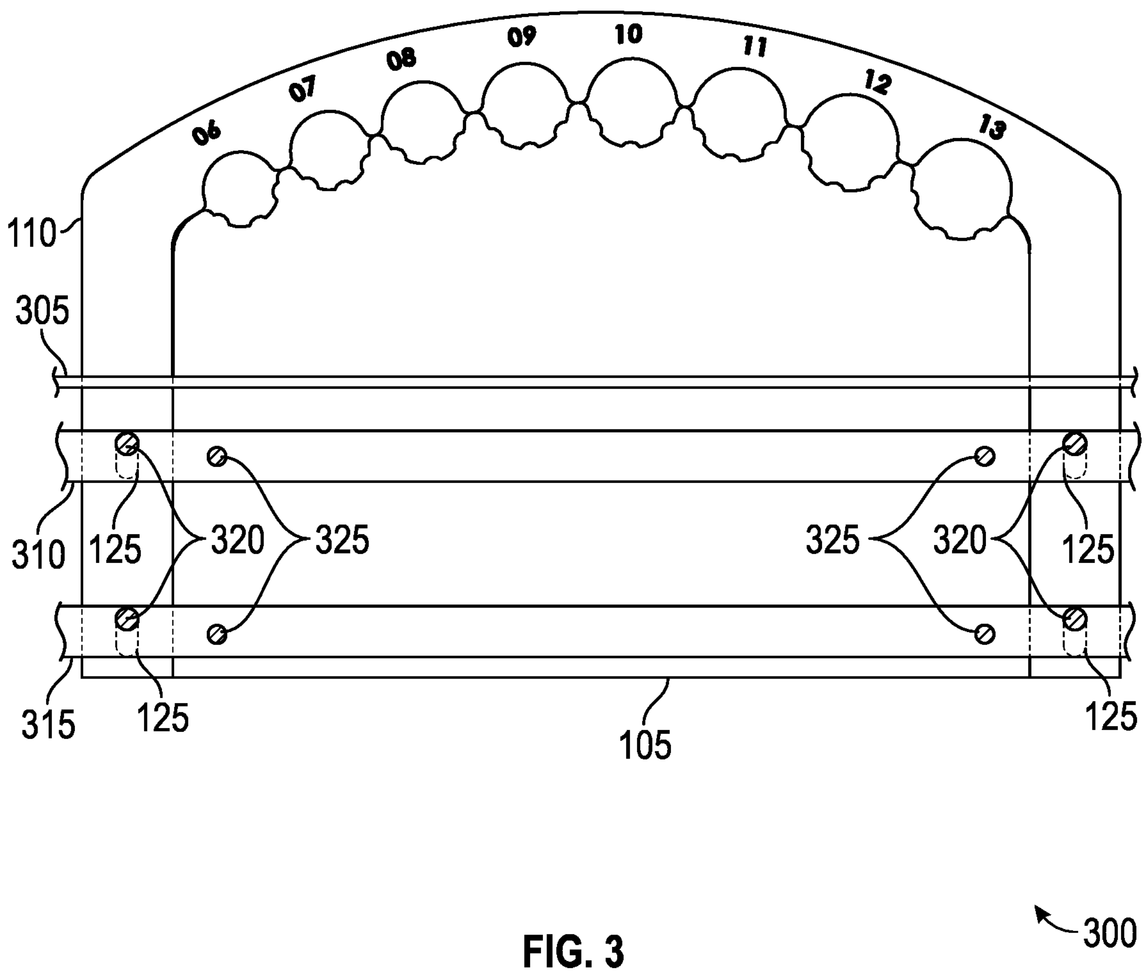
FIGS. 3 and 4 illustrate an example of a ring sizing device and mounting platform in accordance with aspects of the present disclosure.
Figure 4:
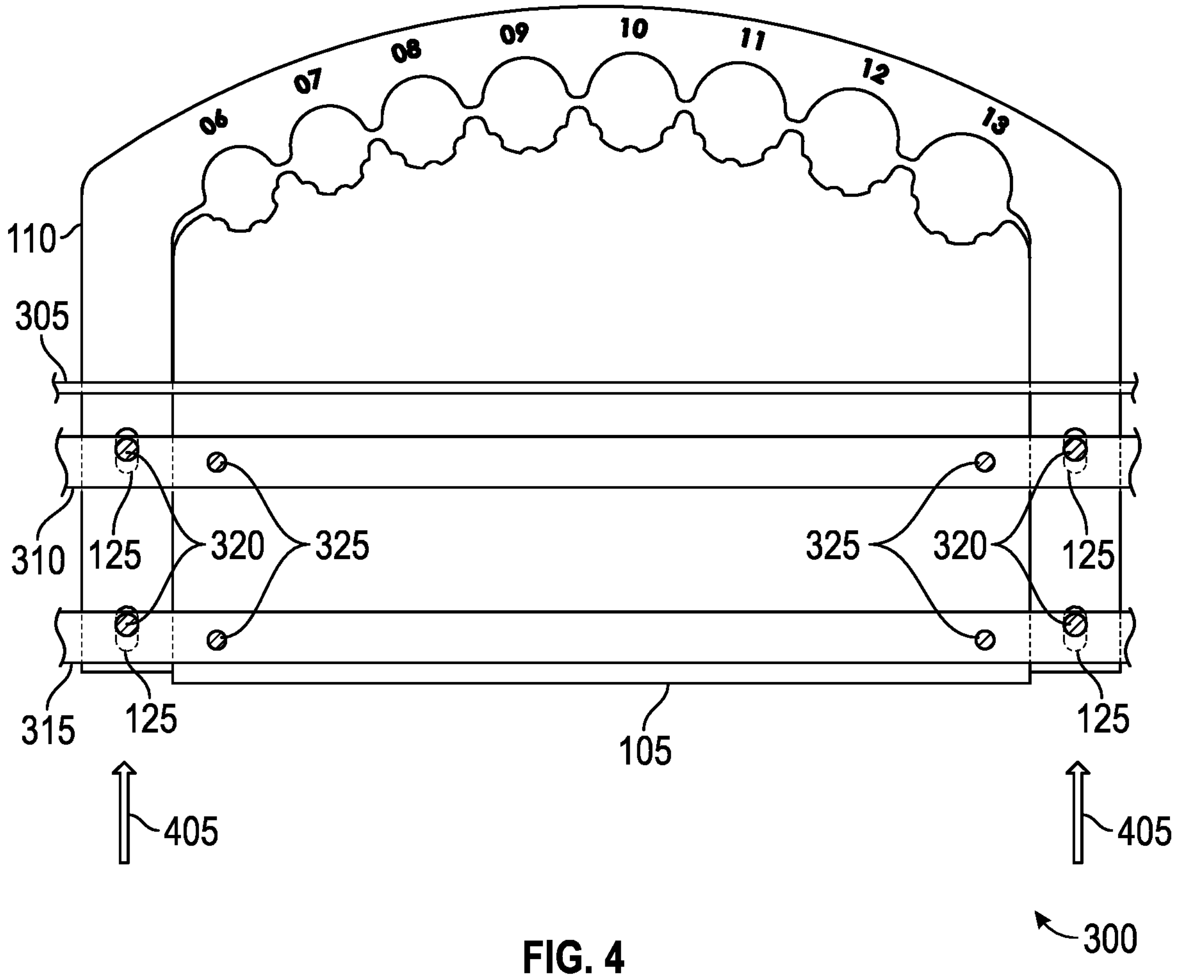

FIGS. 3 and 4 illustrate an example of a system 300 that includes a ring sizing device and an associated platform, that supports a ring size determination in accordance with aspects of the present disclosure. In this example, a ring sizing device such as discussed with reference to FIGS. 1 and 2 may be coupled with a mounting platform that includes a top surface 305, an upper support member 310 and a lower support member 315. As discussed with reference to FIGS. 1 and 2, the stationary panel 105 may include mounting holes, through which mounting studs 325 may be inserted to maintain the stationary panel 105 in a fixed position relative to the top surface. Further, the movable panel 110 may have mounting slots 125, through which mounting studs 320 may be inserted. The oblong shape of the mounting slots 125 in this example allows the movable panel 110 to be moved up and down relative to the stationary panel 105 and the top surface 305, with a range of motion limited by the length of the mounting slots 125. FIG. 3 shows the movable panel 110 in a lowest position, which may be an example of a first position, and FIG. 4 shows the movable panel 110 in a slightly raised position as indicated by arrows 405, which may be an example of a second position. In some aspects, a user may approach a display that includes the ring sizing device and the mounting platform, try out multiple different ring sizes with one or more fingers, and select a ring size that provides a comfortable fit when the movable panel 110 is in the first position. In the event that it is difficult for the user to remove a finger from a sizing hole, the user may move the movable panel 110 upward relative to the stationary panel 105 to enlarge the size of the sizing holes and more easily remove the finger. It is to be understood that the examples of FIGS. 1 through 4 are provided for the purposes of discussion and illustration, and the sizing techniques discussed herein may be implemented using various different types of sizing devices. FIGS. 5A through 11 provide various non-limiting examples of types of sizing devices that may be used in accordance with various aspects discussed herein.

Figure 5A:
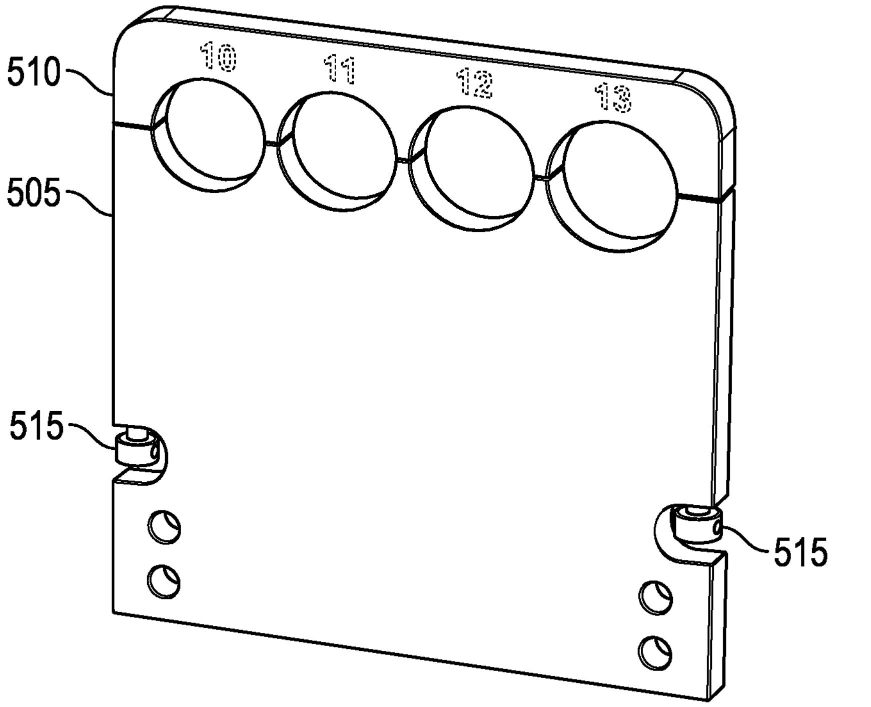
FIGS. 5A, 5B, and 6 illustrate examples of another ring sizing device in accordance with aspects of the present disclosure.
Figure 5B:
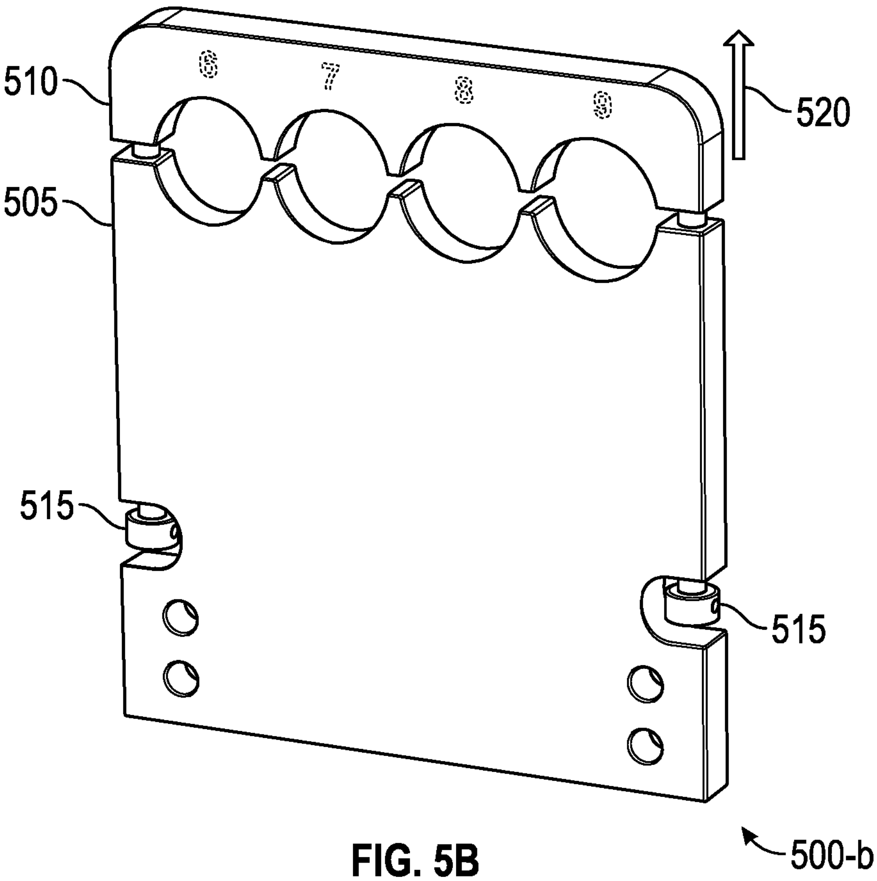
Figure 6:
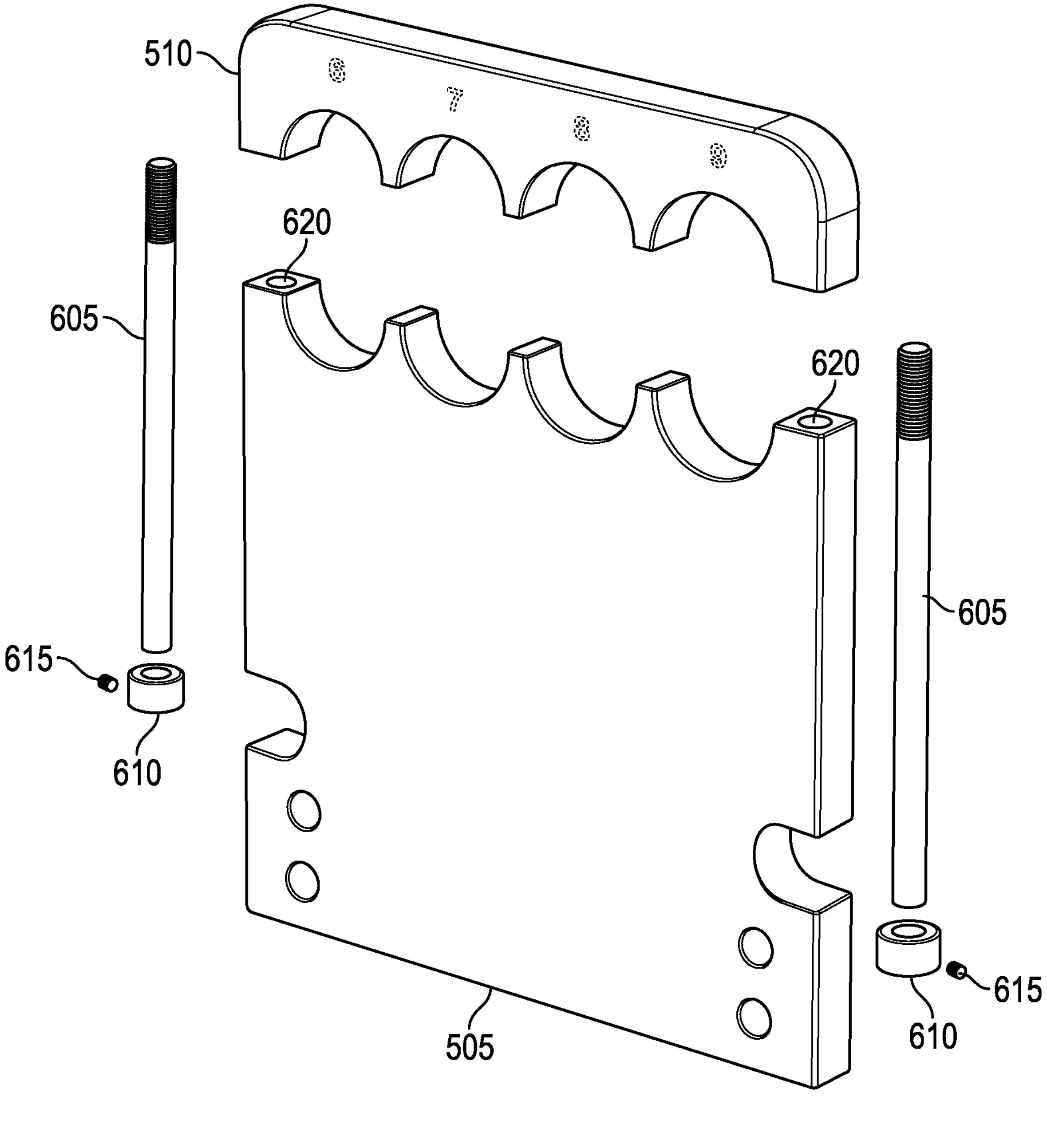

FIGS. 5A, 5B, and 6 illustrate an example of a ring sizing device 500 in accordance with aspects of the present disclosure. In this example, the ring sizing device 500 may include a stationary panel 505 and a movable panel 510, in which the movable panel 510 is coupled with the stationary panel 505 rather than with a mounting platform. In this example, threaded rods 605 may be threaded into a threaded hole in each side of the movable panel 510, and may extend through bores 620 in each side of the stationary panel 505. At a bottom of each bore 620, the stationary panel 505 may include a cavity into which the threaded rods 605 extend. A range limiter 515, such as a collar 610 that may be secured in place with a set screw 615, may be coupled with the end of the threaded rods 605 and be located in the respective cavity on each side of the stationary panel 505. In such a manner, when the movable panel 510 is lifted in the direction of arrow 520, the range limiters 515 prevent the movable panel 510 from being completely removed from the stationary panel 505. In some examples, the ring sizing device 500 may be formed from materials such as discussed above (e.g., metal, plastic, wood, etc.).

Figure 7A:
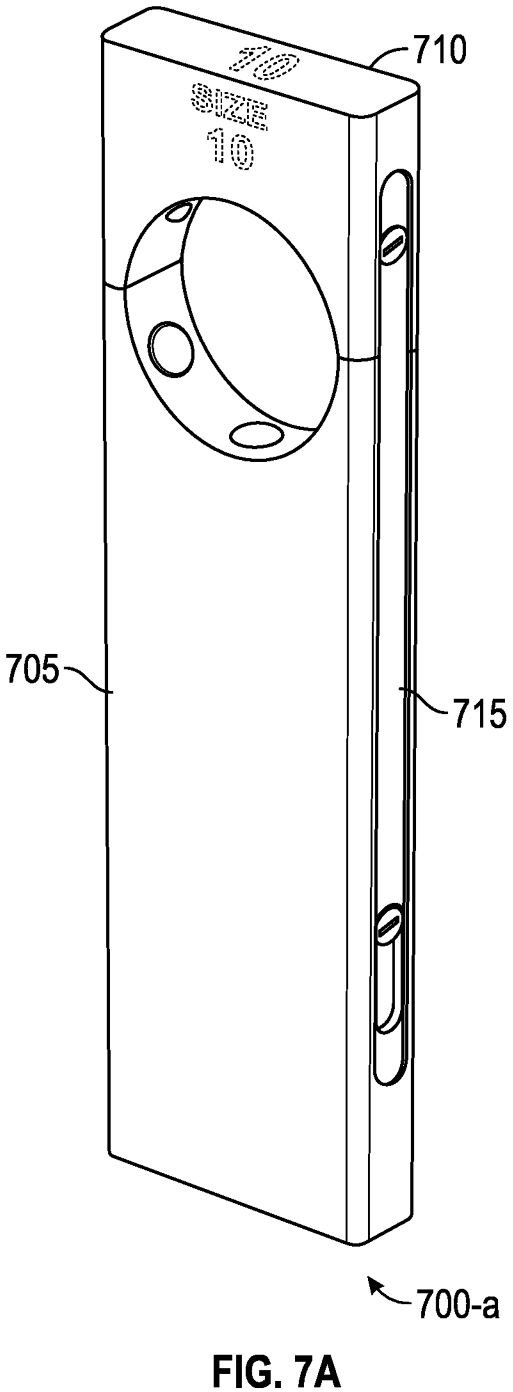
FIGS. 7A, 7B, and 8 illustrate examples of a further ring sizing device in accordance with aspects of the present disclosure.
Figure 7B:
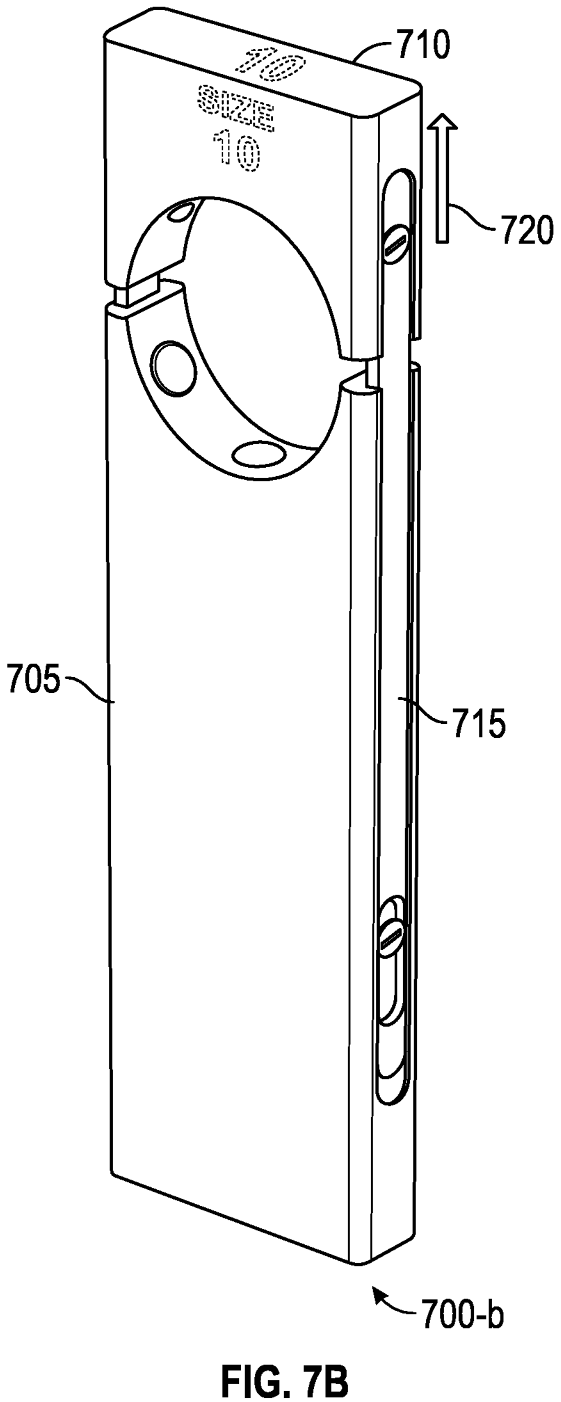
Figure 8:
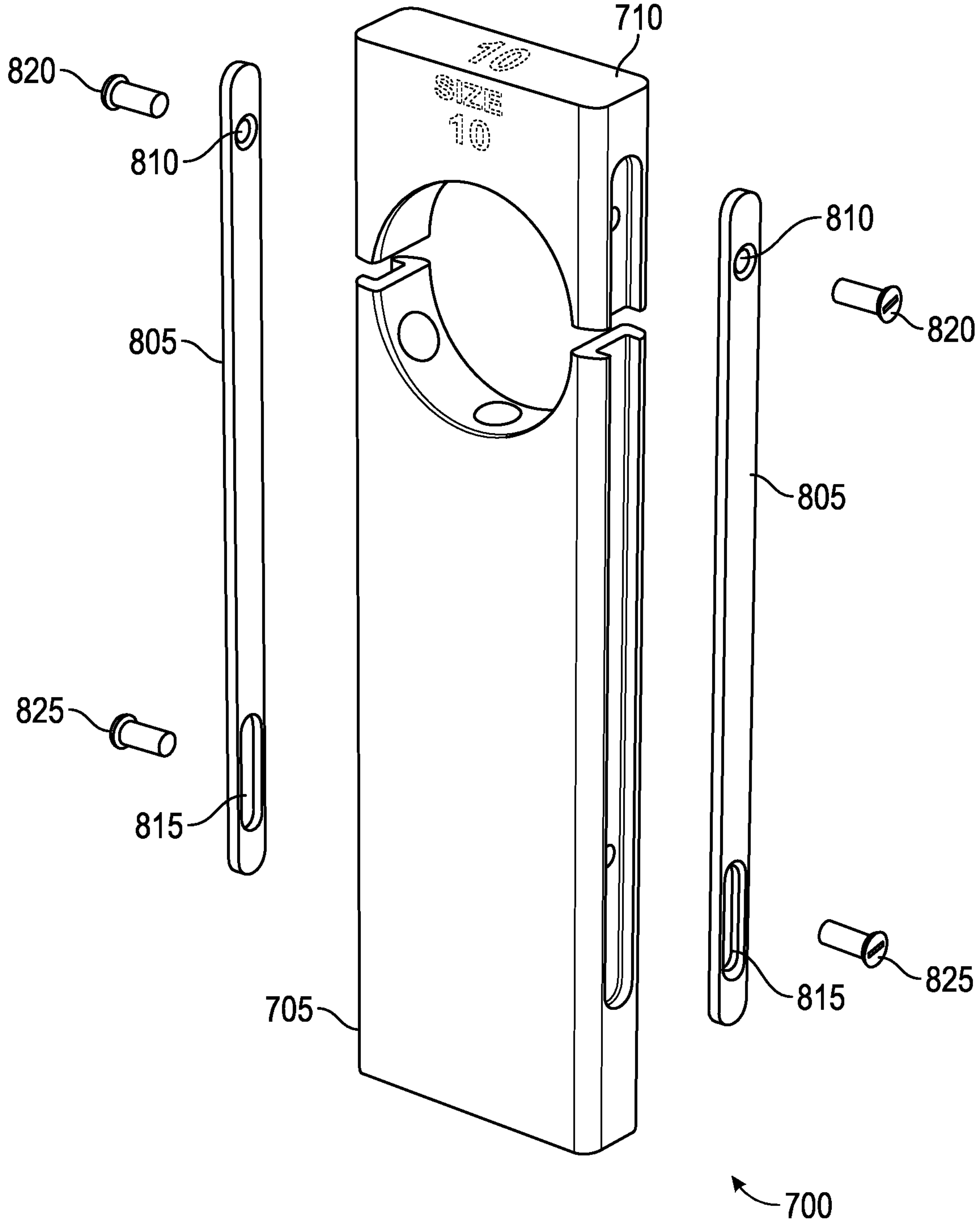

FIGS. 7A, 7B, and 8 illustrate an example of a ring sizing device 700 in accordance with aspects of the present disclosure. In this example, the ring sizing device 500 may include a stationary panel 705 and a movable panel 710, in which the movable panel 710 is coupled with the stationary panel 705 rather than with a mounting platform. In this example, a securement mechanism 715 may secure the movable panel 710 to the stationary panel 705 such that the movable panel 710 remains coupled with the stationary panel 705 when moved in the direction of arrow 720. The securement mechanism 715 of this example may include plates 805 that are located within a channel that extends along at least a portion of the sides of both the stationary panel 705 and the movable panel 710. A top of each plate 805 may be secured with the movable panel 710 with a stud or screw 820 that is inserted through a hole 810 in each plate 805. A bottom of each plate 805 may include a slot 815, and a stud or screw 825 may be inserted through each slot 815 and into the stationary panel 705, such that the plates 805 may be movable within the channel based on a length of the slots 815. In such a manner, when the movable panel 710 is lifted in the direction of arrow 720, the securement mechanism 715 prevents the movable panel 710 from being completely removed from the stationary panel 705. In some examples, multiple ring sizing devices 700 may be provided in which each has a different associated ring size. In some cases, multiple ring sizing devices 700 may be mounted to a mounting platform and allow users to select a desired ring size. The ring sizing device 700 may be formed from materials such as discussed above (e.g., metal, plastic, wood, etc.). In some cases one or more parts of any of the ring sizing devices as discussed herein may be made through 3D printing.

Figure 9:
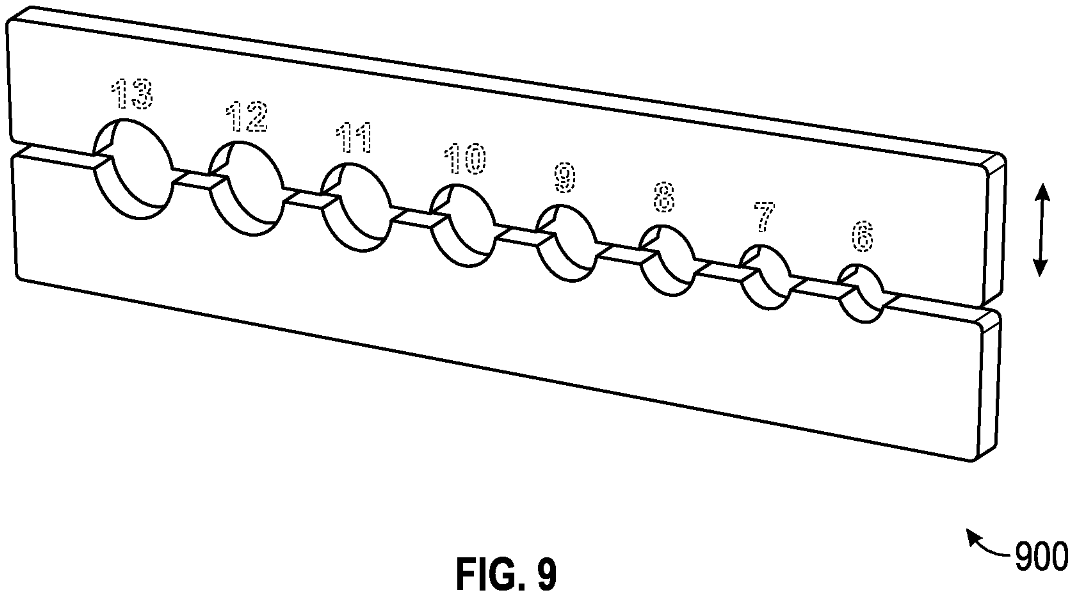
FIGS. 9-11 illustrate examples of several alternative ring sizing devices in accordance with aspects of the present disclosure.

FIG. 9 illustrates another example of a ring sizing device 900 in accordance with aspects of the present disclosure. In this example, top and bottom rectangular plates each have multiple semicircular-shaped notches that correspond to multiple different ring sizes, and the rectangular plates may be moved relative to one another to allow for ring sizing holes to be enlarged to aid in comfortable removal of a finger.

Figure 10:
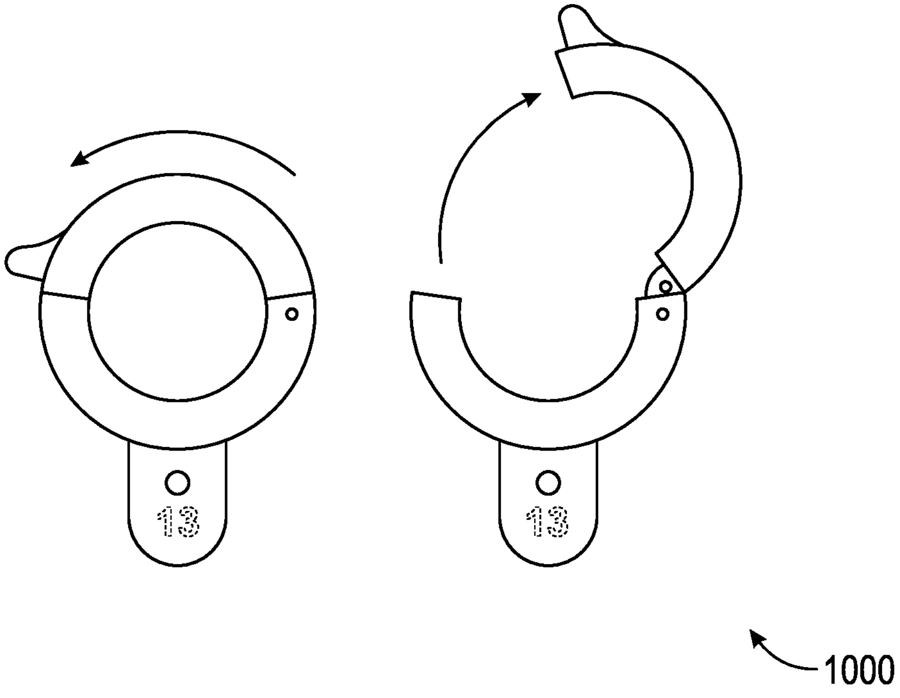

FIG. 10 illustrates another example of a ring sizing device 1000 in accordance with aspects of the present disclosure. In this example, a top and bottom portion of a device may be hinged on one side to allow the top portion to move relative to the bottom portion, to allow for ring sizing holes to be enlarged to aid in comfortable removal of a finger.

Figure 11:
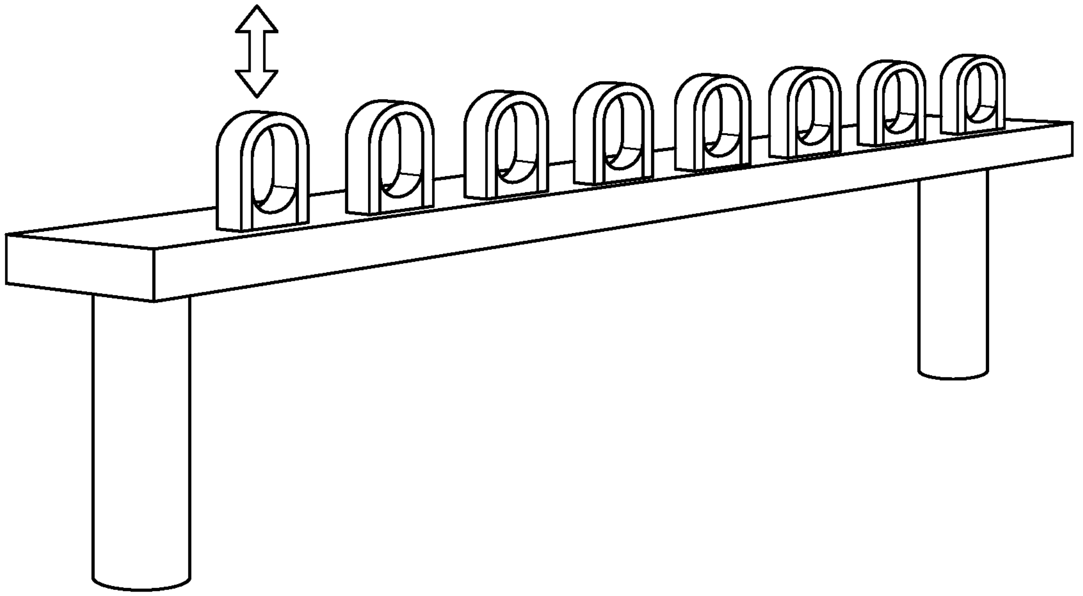

FIG. 11 illustrates a further example of a ring sizing device 1100 in accordance with aspects of the present disclosure. In this example, multiple ring sizing holes may be individually formed on a platform, and a top portion of each ring sizing hole may be moved relative to a bottom portion (e.g., in accordance with any of the various techniques as discussed herein), to allow for ring sizing holes to be enlarged to aid in comfortable removal of a finger.

Figure 12:
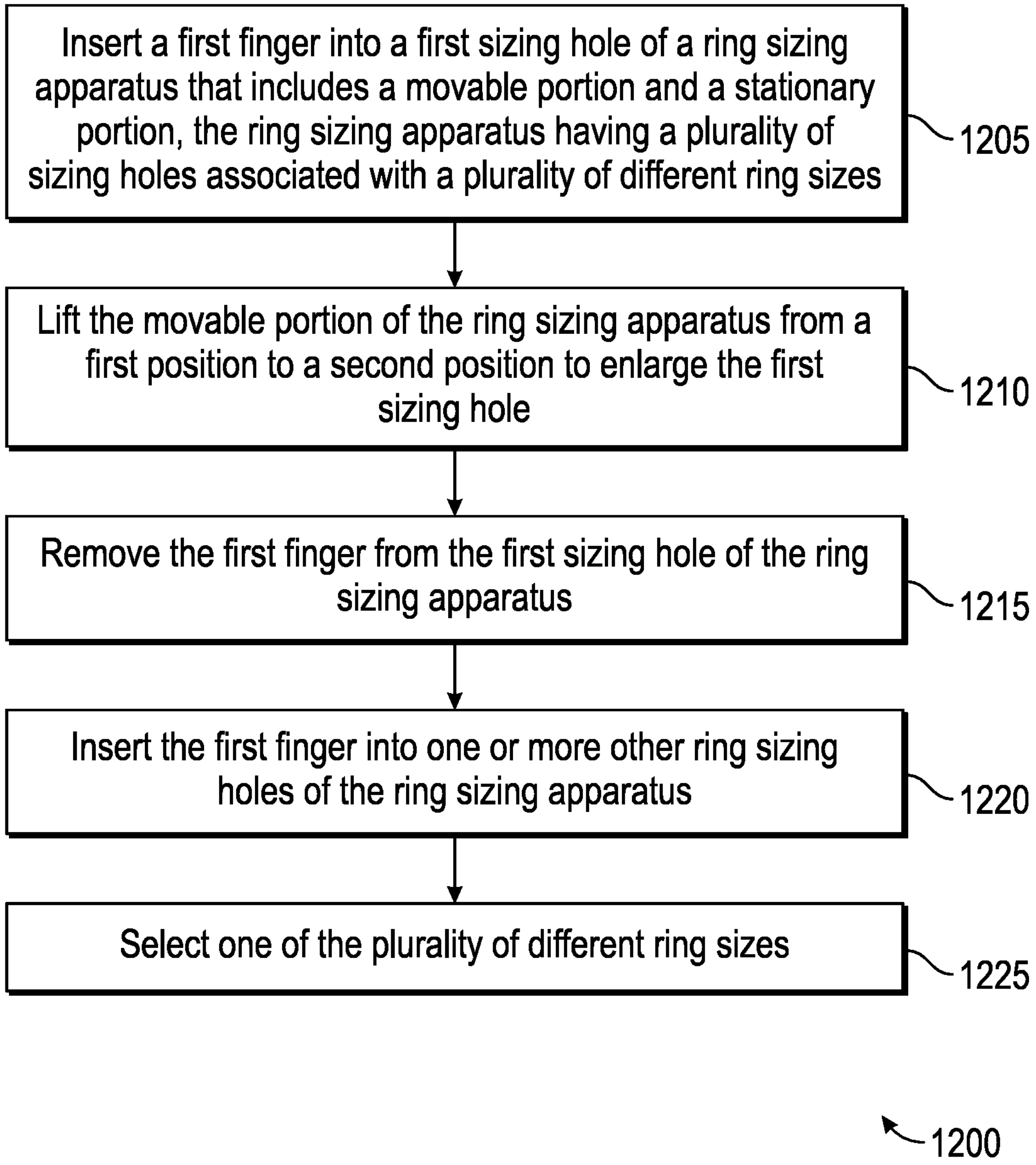
FIG. 12 illustrates a flowchart showing a method that supports ring sizing using a ring sizing device in accordance with aspects of the present disclosure.

FIG. 12 illustrates a flowchart showing a method 1200 that supports ring size determination using a ring sizing device in accordance with aspects of the present disclosure. The operations of the method 1200 may be performed in a different order than described, one or more operations may be combined, and/or one or more additional operations may be added. Operations may be performed using or with the aid of one or more ring sizing devices or components thereof as described herein. For example, the operations of the method 1200 may be performed using any of the devices as described with reference to FIGS. 1 through 11.

At 1205, the method may include inserting a first finger into a first sizing hole of a ring sizing apparatus that includes a movable portion and a stationary portion, the ring sizing apparatus having a plurality of sizing holes associated with a plurality of different ring sizes.

At 1210, the method may include lifting the movable portion of the ring sizing apparatus from a first position to a second position to enlarge the first sizing hole.

At 1215, the method may include removing the first finger from the first sizing hole of the ring sizing apparatus.

At 1220, the method may include inserting the first finger into one or more other ring sizing holes of the ring sizing apparatus.

At 1225, the method may include selecting one of the plurality of different ring sizes.

It should be noted that the methods described above describe possible implementations, and that the operations and the steps may be rearranged or otherwise modified and that other implementations are possible. Furthermore, aspects from two or more of the methods may be combined.

An apparatus is described. The apparatus may include a stationary panel comprising a bottom portion configured to be affixed to a mounting platform and a top portion having a top edge with at least a first semicircular-shaped notch, where a first radius associated the first semicircular-shaped notch corresponds to a first ring size, and a movable panel coupled with the stationary panel and configured to move between a first position in which one or more portions of a bottom edge of the movable panel are in contact with the top edge of the stationary panel, and a second position in which a gap is present between the one or more portions of the bottom edge of the movable panel and the top edge of the stationary panel. In some cases, the bottom edge of the movable panel includes at least a second semicircular-shaped notch having the first radius, the second semicircular-shaped notch aligned with the first semicircular-shaped notch to provide a first hole that corresponds to the first ring size, where the first hole has a first height when the movable panel is in the first position and has a second height that is larger than the first height when the movable panel is in the second position.

In some examples of the apparatus described herein each of the stationary panel and the movable panel have a plurality of semicircular-shaped notches that correspond to a plurality of different ring sizes.

In some examples of the apparatus described herein, the movable panel may further include an upper portion that includes the bottom edge of the movable panel, and a pair of legs that extend from the upper portion toward the mounting platform, wherein one leg extends along each side of the stationary panel and is configured to be movably coupled with the mounting platform. In some examples of the apparatus described herein each leg has a slot at a bottom portion thereof that is configured to engage with the mounting platform and allow the movable panel to move between the first position and the second position when mounted to the mounting platform.

In some examples of the apparatus described herein the stationary panel and the movable panel are configured to be secured to mounting platform at respective bottom portions thereof, and extend away from the mounting platform along a plane, wherein the movable panel moves between first position and the second position along the plane. In some examples of the apparatus described herein the stationary panel includes one or more mounting holes in the bottom portion that are configured to secure the stationary panel to the mounting platform in a fixed position.

In some examples of the apparatus described herein the movable panel is movably secured to the stationary panel.

Some examples of the apparatus described herein may further include a rod that is secured with the movable panel at a first end and extends from the movable panel through a bore in the stationary panel and into a cavity of the stationary panel, wherein a second end of the rod is located within the cavity of the stationary panel; and a range limiter coupled with the second end of the rod that engages with an edge of the cavity when the movable panel is moved to the second position.

In some examples of the apparatus described herein the range limiter includes a collar coupled with the second end of the rod, the collar located within the cavity and having a diameter that is larger than a diameter of the bore in the stationary panel. In some examples of the apparatus described herein the collar is secured at the second end of the rod with a set screw. In some examples of the apparatus described herein the first end of the rod includes threads that engage with a threaded hole of the movable panel.

Some examples of the apparatus described herein may further include a plate that is secured with the movable panel at a first end and extends from the movable panel into a channel along a side of the stationary panel, wherein a second end of the plate terminates within the channel. In some examples of the apparatus described herein the first end of the plate is unmovably coupled with the movable panel and the second end of the plate is movably coupled with the stationary panel. In some examples of the apparatus described herein the second end of the plate is coupled with the stationary panel via a stud from the stationary panel that extends into a slot at the second end of the plate, and provides movement of the plate and the movable panel between the first position and the second position.

In some examples of the apparatus described herein wherein each of the stationary panel and the movable panel has a single semicircular notch, and a plurality of different ring sizing apparatuses each have a different ring size of a plurality of different ring sizes. In some examples of the apparatus described herein each of the plurality of different ring sizing apparatuses are secured to the mounting platform.

A method for ring sizing is described. The method may include inserting a first finger into a first sizing hole of a ring sizing apparatus that includes a movable portion and a stationary portion, the ring sizing apparatus having a plurality of sizing holes associated with a plurality of different ring sizes, lifting the movable portion of the ring sizing apparatus from a first position to a second position to enlarge the first sizing hole, removing the first finger from the first sizing hole of the ring sizing apparatus, inserting the first finger into one or more other ring sizing holes of the ring sizing apparatus, and selecting one of the plurality of different ring sizes.

In some examples of the method described herein the lifting of the movable portion is performed responsive to the first sizing hole being too small to provide for easy removal of the finger from the first sizing hole.

In some examples of the method described herein the selecting the one of the plurality of ring sizes is based at least in part on which ring sizing hole of the plurality of ring sizing holes is identified as providing comfortable insertion and removal of the first finger.

In some examples of the method described herein the selecting the one of the plurality of ring sizes is based at least in part on which ring sizing hole of the plurality of ring sizing holes is identified as providing comfortable insertion and removal of at least two fingers.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A ring sizing apparatus, comprising:

a stationary panel comprising a bottom portion configured to be affixed to a mounting platform and a top portion having a top edge with at least a first semicircular-shaped notch, wherein a first radius associated the first semicircular-shaped notch corresponds to a first ring size; and a movable panel coupled with the stationary panel and configured to move between a first position in which one or more portions of a bottom edge of the movable panel are in contact with the top edge of the stationary panel, and a second position in which a gap is present between the one or more portions of the bottom edge of the movable panel and the top edge of the stationary panel, wherein the bottom edge of the movable panel includes at least a second semicircular-shaped notch having the first radius, the second semicircular-shaped notch aligned with the first semicircular-shaped notch to provide a first hole that corresponds to the first ring size, and wherein the first hole has a first height when the movable panel is in the first position and has a second height that is larger than the first height when the movable panel is in the second position.

2. The apparatus of claim 1, wherein each of the stationary panel and the movable panel have a plurality of semicircular-shaped notches that correspond to a plurality of different ring sizes.

3. The apparatus of claim 1, wherein the movable panel comprises:

an upper portion that includes the bottom edge of the movable panel, and a pair of legs that extend from the upper portion toward the mounting platform, wherein one leg extends along each side of the stationary panel and is configured to be movably coupled with the mounting platform.

4. The apparatus of claim 3, wherein each leg has a slot at a bottom portion thereof that is configured to engage with the mounting platform and allow the movable panel to move between the first position and the second position when mounted to the mounting platform.

5. The apparatus of claim 1, wherein:

the stationary panel and the movable panel are configured to be secured to mounting platform at respective bottom portions thereof, and extend away from the mounting platform along a plane, wherein the movable panel moves between first position and the second position along the plane.

6. The apparatus of claim 1, wherein the stationary panel includes one or more mounting holes in the bottom portion that are configured to secure the stationary panel to the mounting platform in a fixed position.

7. The apparatus of claim 1, wherein the movable panel is movably secured to the stationary panel.

8. The apparatus of claim 7, further comprising:

a rod that is secured with the movable panel at a first end and extends from the movable panel through a bore in the stationary panel and into a cavity of the stationary panel, wherein a second end of the rod is located within the cavity of the stationary panel; and a range limiter coupled with the second end of the rod that engages with an edge of the cavity when the movable panel is moved to the second position.

9. The apparatus of claim 8, wherein the range limiter includes a collar coupled with the second end of the rod, the collar located within the cavity and having a diameter that is larger than a diameter of the bore in the stationary panel.

10. The apparatus of claim 9, wherein the collar is secured at the second end of the rod with a set screw.

11. The apparatus of claim 8, wherein the first end of the rod includes threads that engage with a threaded hole of the movable panel.

12. The apparatus of claim 1, further comprising:

a plate that is secured with the movable panel at a first end and extends from the movable panel into a channel along a side of the stationary panel, wherein a second end of the plate terminates within the channel.

13. The apparatus of claim 12, wherein the first end of the plate is unmovably coupled with the movable panel and the second end of the plate is movably coupled with the stationary panel.

14. The apparatus of claim 13, wherein the second end of the plate is coupled with the stationary panel via a stud from the stationary panel that extends into a slot at the second end of the plate, and provides movement of the plate and the movable panel between the first position and the second position.

15. The apparatus of claim 1, wherein each of the stationary panel and the movable panel has a single semicircular notch, and a plurality of different ring sizing apparatuses each have a different ring size of a plurality of different ring sizes.

16. The apparatus of claim 15, wherein:

each of the plurality of different ring sizing apparatuses are secured to the mounting platform.

17. A method for ring sizing, comprising:

inserting a first finger into a first sizing hole of a ring sizing apparatus that includes a movable portion and a stationary portion, the ring sizing apparatus having a plurality of sizing holes associated with a plurality of different ring sizes;

lifting the movable portion of the ring sizing apparatus from a first position to a second position to enlarge the first sizing hole;

removing the first finger from the first sizing hole of the ring sizing apparatus;

inserting the first finger into one or more other ring sizing holes of the ring sizing apparatus; and selecting one of the plurality of different ring sizes.

18. The method of claim 17, wherein the lifting of the movable portion is performed responsive to the first sizing hole being too small to provide for easy removal of the finger from the first sizing hole.

19. The method of claim 17, wherein the selecting the one of the plurality of ring sizes is based at least in part on which ring sizing hole of the plurality of ring sizing holes is identified as providing comfortable insertion and removal of the first finger.

20. The method of claim 17, wherein the selecting the one of the plurality of ring sizes is based at least in part on which ring sizing hole of the plurality of ring sizing holes is identified as providing comfortable insertion and removal of at least two fingers.

* * * * *